United States Patent
Callegari et al.

(10) Patent No.: US 12,255,749 B2
(45) Date of Patent: Mar. 18, 2025

(54) MEETING INSIGHTS WITH LARGE LANGUAGE MODELS

(71) Applicant: Microsoft Technology Licensing, LLC, Redmond, WA (US)

(72) Inventors: Shawn Cantin Callegari, Bellevue, WA (US); Umesh Madan, Bellevue, WA (US); Samuel Edward Schillace, Portola Valley, CA (US); Abby Harrison, Woodinville, WA (US); Gina Elizabeth Triolo, Redmond, WA (US); Mark Karle, Seattle, WA (US); LeRoy F. Miller, Tacoma, WA (US); Devis Lucato, Kirkland, WA (US); Tara Eve Walker, Atlanta, GA (US); Brian Krabach, Snohomish, WA (US); Adrian Wyatt Bonar, Seattle, WA (US); Alexander Chao, Irvine, CA (US); Nicholas Becker, Boulder, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/129,758

(22) Filed: Mar. 31, 2023

(65) Prior Publication Data

US 2024/0205037 A1 Jun. 20, 2024

Related U.S. Application Data

(60) Provisional application No. 63/440,590, filed on Jan. 23, 2023, provisional application No. 63/433,619, (Continued)

(51) Int. Cl.
    *H04L 12/18* (2006.01)

(52) U.S. Cl.
    CPC ...... *H04L 12/1822* (2013.01); *H04L 12/1831* (2013.01)

(58) Field of Classification Search
    CPC ................ H04L 12/1822; H04L 12/1831
    See application file for complete search history.

(56) References Cited

U.S. PATENT DOCUMENTS 11,017,780 B2   5/2021 Steelberg
11,095,468 B1 * 8/2021 Pandey ............... H04L 12/1831
(Continued)

OTHER PUBLICATIONS

International Search Report and Written Opinion received for PCT Application No. PCT/US2023/081254, Apr. 10, 2024, 10 pages.
(Continued)

*Primary Examiner* — Raqiul A Choudhury

(57) ABSTRACT

In accordance with examples of the present disclosure, a collaborative platform provides a digital collaboration assistant that continuously monitors and analyzes shared meeting contents (e.g., voice, text chat messages, shared links and documents, presentation materials, and the like) by participants during a collaborative meeting in near real-time, periodically updates a structure summary log of the meeting contents that are deemed important during the collaborative meeting, and interacts with the participants throughout the collaborative meeting in near real-time, for example, to answer questions or provide additional information.

20 Claims, 11 Drawing Sheets

Related U.S. Application Data filed on Dec. 19, 2022, provisional application No. 63/433,627, filed on Dec. 19, 2022.

(56) References Cited

U.S. PATENT DOCUMENTS

| | | | |
|---|---|---|---|
| 11,106,736 | B1 | 8/2021 | Newman |
| 11,443,164 | B2 | 9/2022 | Dalli |
| 11,573,993 | B2* | 2/2023 | Nelson ............... G06F 16/345 |
| 11,823,477 | B1 | 11/2023 | Ramezani |
| 2003/0115548 | A1 | 6/2003 | Melgar |
| 2017/0212886 | A1 | 7/2017 | Sarikaya et al. |
| 2018/0151081 | A1 | 5/2018 | Chen |
| 2019/0028520 | A1* | 1/2019 | Nawrocki ............ G06F 40/205 |
| 2019/0384813 | A1* | 12/2019 | Mahmoud ........... G06F 40/289 |
| 2020/0133071 | A1 | 4/2020 | Dai |
| 2020/0311122 | A1* | 10/2020 | Ramamurthy ........ G06N 20/20 |
| 2020/0311162 | A1 | 10/2020 | Xu et al. |
| 2020/0403817 | A1* | 12/2020 | Daredia ............... G06F 16/438 |
| 2021/0109769 | A1 | 4/2021 | Chenguang |
| 2021/0117479 | A1 | 4/2021 | Liu |
| 2021/0182341 | A1 | 6/2021 | Mullins |
| 2021/0224336 | A1 | 7/2021 | Bright |
| 2021/0271707 | A1 | 9/2021 | Lin |
| 2021/0303638 | A1 | 9/2021 | Zhong et al. |
| 2022/0100831 | A1 | 3/2022 | Moreno |
| 2022/0200934 | A1 | 6/2022 | Dutta |
| 2022/0342900 | A1 | 10/2022 | Basu |
| 2022/0358713 | A1 | 11/2022 | Krishnamurthy |
| 2022/0385758 | A1* | 12/2022 | Tadesse ................ G10L 25/51 |
| 2023/0035076 | A1 | 2/2023 | Wang |
| 2023/0111517 | A1 | 4/2023 | Anderson |
| 2023/0142718 | A1 | 5/2023 | Asgekar |
| 2023/0153641 | A1* | 5/2023 | Manda ................. G06F 40/295 707/603 |
| 2023/0153700 | A1 | 5/2023 | Lindgren |
| 2023/0155903 | A1 | 5/2023 | Song |
| 2024/0078376 | A1 | 3/2024 | Li |
| 2024/0201959 | A1 | 6/2024 | Callegari |
| 2024/0202173 | A1 | 6/2024 | Schillace |
| 2024/0202451 | A1 | 6/2024 | Schillace |
| 2024/0202452 | A1 | 6/2024 | Schillace |
| 2024/0202460 | A1 | 6/2024 | Schillace |
| 2024/0202582 | A1 | 6/2024 | Schillace |
| 2024/0202584 | A1 | 6/2024 | Schillace |

OTHER PUBLICATIONS

International Search Report and Written Opinion received for PCT Application No. PCT/US2023/081290, Mar. 11, 2024, 17 pages.
International Search Report and Written Opinion received for PCT Application No. PCT/US2023/082379, Apr. 22, 2024, 12 pages.
"Long-term Memory for AI," Vector Database for Vector Search, Pinecone Systems, Inc., retrieved from: https://www.pinecone.io/, Mar. 27, 2023, 10 pages.
Anonymous: "Is there way to submit a table as an JSON file?", Aug. 19, 2022, Retrieved from the Internet: URL: https://web.archive.org/web/20220819203852/https://community.openai.com/t/is-there-way-to-submit-a-table-as-an-json-file/5299, 1 page.
Anonymous: "OpenAI—Spreadsheet creator", Aug. 19, 2022, XP093140385, Retrieved from the Internet: URL: https://platform.openai.com/examples/default-spreadsheet-gen, 1 page.
Anonymous: "Skill Chaining—Wikipedia, the free encyclopedia", Nov. 27, 2015, Retrieved from the Internet: URL: https://web.archive.org/web/20151127070537/https://en.wikipedia.org/wiki/Skill_chaining, 1 page.
Beaumont, Romain., "Semantic search with embeddings: index anything", Dec. 1, 2020, Retrieved from the Internet: URL: https://web.archive.org/web/20221212165434/https://rom1504.medium.com/semantic-search-with-embeddings-index-anything-8fb18556443c, retrieved on Jan. 26, 2024, 27 pages.
Chan Irene, "How to Create Meetings Summaries with OpenAI GPT -3", Dec. 16, 2022, 04 pages.
Fukamizu, et al., "Generation High resolution 3D model from natural language by Generative Adversarial Network", arxiv.org, Cornell University Library, 201 Olin Library Cornell University Ithaca, NY 14853, Jan. 22, 2019, 9 pages.
Holovaty, Adrian: "Adventures in generating music via ChatGPT text prompts", Dec. 1, 2022, Retrieved from the Internet: URL: https://web.archive.org/web/20221217201750/https://www.holovaty.com/writing/chatgpt-music-generation/, 10 pages.
International Search Report and Written Opinion received for PCT Application No. PCT/US2023/081261, mailed on Feb. 12, 2024, 15 pages.
International Search Report and Written Opinion received for PCT Application No. PCT/US2023/081271, mailed on Mar. 13, 2024, 12 pages.
International Search Report and Written Opinion received for PCT Application No. PCT/US2023/081303, mailed on Mar. 26, 2024, 15 pages.
International Search Report and Written Opinion received for PCT Application No. PCT/US2023/081323, mailed on Mar. 13, 2024, 17 pages.
International Search Report and Written Opinion received for PCT Application No. PCT/US2023/081342, mailed on Mar. 26, 2024, 14 pages.
Kan, "Not All Vector Databases Are Made Equal," Towards Data Science, Oct. 2, 2021, retrieved from: https://towardsdatascience.com/milvus-pinecone-vespa-weaviate-vald-gsi-what-unites-these-buzz-words-and-what-makes-each-9c65a3bd0696, Mar. 27, 2023, 15 pages.
Konidaris, et al., "Skill Discovery in Continuous Reinforcement Learning Domains using Skill Chaining", Dec. 10, 2009, Retrieved from the Internet: URL: https://proceedings.neurips.cc/paper_files/paper/2009/file/e0cf1f47118daebc5b162 69099ad7347-Paper.pdf, 9 pages.
Magnani, et al., "Semantic Retrieval at Walmart", Proceedings of the 59th ACM/IEEE Design Automation Conference, ACMPUB27, New York, NY, USA, Aug. 14, 2022, pp. 3495-3503.
Non-Final Office Action mailed on Sep. 10, 2024, in U.S. Appl. No. 18/122,563, 27 pages.
T, Vincent., "GPT-3 And Code Generation—AI-enabled Instant Software Development", Jan. 12, 2021, retrieved from the Internet: URL: https://becominghuman.ai/gpt-3-and-cod e-generation-ai-enabled-instant-software-d evelopment-270795077cbd, 10 pages.
Final Office Action mailed on Jan. 3, 2025, in U.S. Appl. No. 18/122,563, 31 pages.
Non-Final Office Action mailed on Jan. 16, 2025, in U.S. Appl. No. 18/129,668, 22 pages.

* cited by examiner

500

514

Imagine, for example, you bring MyCopilot with you.
To a conference. To a meeting.
In a webinar and he sits there in the room or your computer listening to have everything that's happening in through the microphone.
So it could be a call with FaceTime, Google Voice teams, Skype, anything.
The app uses cognitive services speech.
To transcribe in real time, you can see there is a log here on the screen.
It passes that text to OpenAI with a couple of predefined questions. Like I always want to have a summary, I always want to have some notes and maybe I can add some more questions like how does it work?
So now if I keep talking the new questions I ask, they will be answered in real time and they will keep being updated. So it's kind of having a person taking notes, answering questions for you in real time and you could have hundreds of questions.
This could be a huge screen in the room with all the information they want to capture.
Maybe you can even make that interactive, like talking to AI about adding and removing things.

Summary
The app MyCopilot uses cognitive services speech to transcribe in real time and passes the text to OpenAI with a couple of predefined questions. The app is designed to take notes and answer questions for the user in real time, allowing the user to focus on the task at hand. 506

Notes 508
MyCopilot
- App uses cognitive services speech to transcribe in real time.
- Passes text to OpenAI with a couple of predefined questions.
- Can add more questions.
- Huge screen in the room with all the information they want to capture.

How does it work? 512
The app uses cognitive services speech to transcribe in real time. It passes that text to OpenAI with a couple of predefined questions. The app then uses cognitive services speech to answer the questions in real time.

502

510 [anything I can do for you?]

*Fig. 5*

MEETING INSIGHTS WITH LARGE LANGUAGE MODELS

CROSS-REFERENCE TO RELATED APPLICATIONS

This application claims priority to U.S. Provisional Application No. 63/440,590, titled "Meeting Insights with Large Language Models," filed on Jan. 23, 2023, U.S. Provisional Application No. 63/433,619, titled "Storing Entries in and Retrieving information From an Embedding Object Memory," filed on Dec. 19, 2022, and U.S. Provisional Application No. 63/433,627, titled "Multi-Stage Machine Learning Model Chaining," filed on Dec. 19, 2022, the entire disclosures of which are hereby incorporated by reference in their entirety.

BACKGROUND

A collaborative platform provides a collaborative environment to allow users to share contents during a collaborative meeting and provide easy access to the shared contents. Recent enhancements in collaboration platforms further improve upon sharing documents, links, tracking tasks, e-mail efficacy, and idea and information sharing. Some collaborative platforms may provide a digital collaboration assistant. However, use of the collaboration assistant is generally limited to capturing transcripts during the collaborative meeting and processing captured transcripts after the collaborative meeting, for example, to generate a meeting summary. Additionally, the meeting summary may include too much information including those that are deemed not important.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In accordance with examples of the present disclosure, a collaborative platform provides a digital collaboration assistant that continuously monitors and analyzes shared meeting contents (e.g., voice, text chat messages, shared links and documents, presentation materials, and the like) by participants during a collaborative meeting in real-time or near real-time, periodically updates a structure summary log of the meeting contents that are deemed important during the collaborative meeting, and interacts with the participants throughout the collaborative meeting in near real-time, for example, to answer questions or provide additional information.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

FIG. 5 is an exemplary user interface of a participant illustrating an interaction between a collaboration assistant and the participant during a collaborative meeting in accordance with examples of the present disclosure;

DETAILED DESCRIPTION

Figure 1:
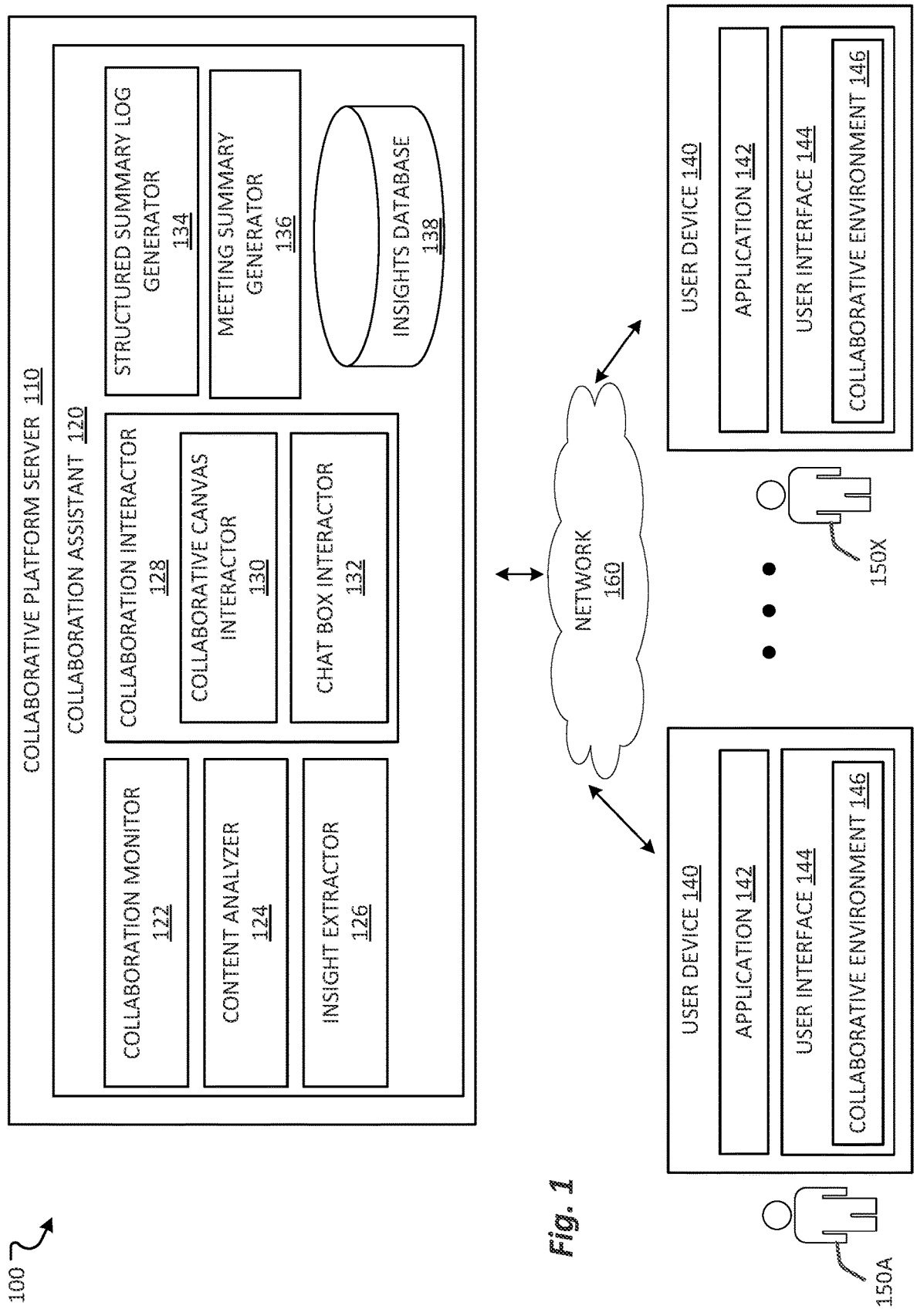
FIG. 1 depicts details directed to a collaborative communication system including a collaboration assistant for facilitating collaboration during a collaborative meeting in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

A collaborative platform provides a collaborative environment to allow users to share contents during a collaborative meeting and provide easy access to the shared contents. Recent enhancements in collaboration platforms further improve upon sharing documents, links, tracking tasks, e-mail efficacy, and idea and information sharing. Some collaborative platforms may provide a digital collaboration assistant. However, use of the collaboration assistant is generally limited to capturing transcripts during the collaborative meeting and processing captured transcripts after the collaborative meeting, for example, to generate a meeting summary. Additionally, the meeting summary may include too much information including those that are deemed not important.

In accordance with examples of the present disclosure, a collaborative communication system allows users to create a collaborative environment on a collaborative platform (e.g., Microsoft® Teams®) with other users. Collaboration may involve phone/video calls, text chat threads, email threads, conversations, document sharing, task tracking, scheduled meetings, and the like.

In accordance with examples of the present disclosure, the collaborative platform provides a digital collaboration artificial intelligence assistant that continuously monitors and analyzes shared meeting contents (e.g., voice, text chat messages, shared links and documents, presentation materials, and the like) by participants during a collaborative meeting in real-time or near real-time (e.g., accounting for some latency), periodically updates a structure summary log of the meeting contents that are deemed important during the collaborative meeting, and interacts with the participants throughout the collaborative meeting in real-time or near real-time, for example, to answer questions or provide additional information.

It should be appreciated that although, for example purposes, described aspects generally relate to applications, e.g., such as email applications, chat applications, collaborative platforms, and the like, the present methods and systems are not so limited. For example, collaboration content described herein may be used to provide collaborative experiences in applications other than messaging applications, such as word processing applications, spreadsheet applications, notebook applications, presentation applications, instant messaging or chat applications, social networking platforms, and the like.

Referring now to FIG. 1, an example collaborative communication system 100 for facilitating collaborations between users is provided, in accordance with an embodiment of the present disclosure. To do so, the collaborative communication system 100 includes a collaborative platform server 110 that is communicatively coupled to a plurality of computing devices 140 associated with users (e.g., participants of a collaborative meeting) 150 in via a network 160. The network 160 may include any kind of computing network including, without limitation, a wired or wireless local area network (LAN), a wired or wireless wide area network (WAN), and/or the Internet.

Specifically, FIG. 1 illustrates an overview of an example collaborative communication system 100 through which participants of a collaboration meeting may collaborate with one another via a collaborative platform server 110. Meeting contents may be shared and/or updated during the collaborative meeting via an application 142 that is communicatively coupled to the collaborative platform server 110. For example, the meeting contents may include voice of participants, text chat messages, shared links and documents, presentation materials, and the like. It should be appreciated that any content (e.g., materials, documents, data, etc.) discussed or shared during a collaborative meeting may be automatically associated with the collaborative meeting and stored in an insight database and/or a semantic memory, which may be accessible by one or more participants of the collaborative meeting based on any applicable permissions or rights to the contents assigned to each participant. It should be appreciated that each user or participant 150 of the collaborative platform may customize the participant's collaborative environment, which is displayable on a user interface 144 of the user device 140.

It should be appreciated that the term "participants" of a collaborative meeting in the present application refers to all individuals who are invited to the collaborative meeting, including an individual who created the collaborative meeting, one or more individuals who are attending the collaborative meeting in real-time (also referred to as the "attending participant"), and one or more individuals who are not attending the collaborative meeting in real-time (also referred to as the "non-attending participant") but may participate, follow, or otherwise involved in the collaborative meeting.

The collaborative platform server 110 includes a collaboration assistant 120, which is configured to facilitate a collaborative meeting in real-time or near real-time using one or more machine-learning models (e.g., one or more generative machine learning models). The one or more generative machine learning models (or other types of machine learning models) may be leveraged to determine semantic meaning to be extracted from content objects in the form of embeddings that can be compared against the semantic meaning of other content objects such that a quantitative similarity between the embeddings can be determined. A similarity between content objects can provide semantic context to the collaboration assistant 120 when determining if an action should be performed and/or what action should be performed.

To do so, the collaboration assistant 120 further includes a collaboration monitor 122, a content analyzer 124, an insight extractor 126, a collaboration interactor 128, a structured summary log generator 134, and a meeting summary generator 136. These various components are described as conceptually distinct, however, one of skill in the art will appreciate that the determinations, decisions, and/or content determinations detailed below as being performed by the individual components can be performed using one or more generative machine learning models, large language pre-trained models (or other types of machine learning models), and/or by one or more applications or processes interacting with a generative machine learning model (other types of machine learning models), for example. Further, the generative pre-trained model that may be leveraged to perform the functionality described for the different components that make up part of collaboration assistant 120 need not be specifically trained to perform the specific functions. Rather, in aspects, a general generative model may be leveraged to perform the various different functionalities described herein.

The collaboration monitor 122 is configured to monitor a collaborative meeting in near real-time. Specifically, the collaboration monitor 122 is configured to monitor activities of the attending participants by monitoring a collaborative canvas accessible by all participants, a group chat box, and a private chat box associated with the collaborative meeting. For example, the attending participants may share contents during the collaborative meeting. The meeting contents include the voices of participants, text transcript of speech of participants, text chat messages, shared links and documents, presentation materials, and the like. Additionally, the collaboration monitor 122 is further configured to monitor activities of any non-attending participants. For example, a non-attending participant may request the collaboration monitor 122 to send a periodic update throughout the collaborative meeting and/or a notification when the non-attending participant is mentioned during the collaborative meeting in near real-time. Data gathered by the collaboration monitor 122 can be processed using a generative pre-trained machine learning model (or other type of machine learning model) and/or a process or an application leveraging a generative pre-trained machine learning model.

The content analyzer 124 is configured to analyze and classify the meeting contents that were shared by the participants in near real-time during the collaborative meeting. The classification of the meeting contents is based on a type of the meeting contents. For example, the types of the meeting contents include voices, text transcript or text chat messages, shared links and documents, and presentation materials (e.g., materials presented to the participants during the collaborative meeting). The content analyzer 124 may be a generative pre-trained machine learning model (or other type of machine learning model) and/or a process or an application leveraging a generative pre-trained machine learning model.

The insight extractor 126 is configured to extract insights from the classified meeting contents using one or more semantic models (e.g., semantic embedding models). Specifically, the insight extractor 126 is configured to extract and update the insights every predetermined time period based on the classified meeting contents that have hitherto been shared in the collaborative meeting. For example, the insights include key points, action items, question and answer (QnA) pairs, contents from links and documents, and screenshots of presentation materials. The insight extractor 126 may store the insights in an insight database 138. The insight database may be a machine learning semantic memory datastore. The insight extractor 126 may be a generative pre-trained machine learning model (or other type of machine learning model) and/or a process or an application leveraging a generative pre-trained machine learning model.

In the illustrative aspect, the insight extractor 126 is configured to extract key points of the collaborative meeting based on what was discussed and shared among the participants of the collaborative meeting. The key points may further include an identity of one or more participants who were discussing and whether any conclusions, decisions, or suggestions were made. The key points may be extracted based on the meeting contents that are likely be important to the participants. To do so, the insight extractor 126 is configured to extract the insights based on the engagement and interest of the participants. For example, the insight extractor 126 is configured to recognize something as important based on engagement and interests of the participants. To do so, the insight extractor 126 is configured to listen to voices of the participants for sentiment analysis to determine if the participants have strong reaction (e.g., particularly excited, upset, or emotional). Additionally, the insight extractor 126 is configured to monitor a density of dialog, a number of participants speaking or texting, a number of hand-raised or emojis in a chat box associated with the collaborative meeting when a particular topic or meeting content is shared during the collaborative meeting. Generally, more engagement by the participants indicates that it is more important or interesting part of the collaborative meeting. In some aspects, the insight extractor 126 is configured to learn and predict the interests of the participants based on the meeting contents discussed or shared during the collaborative meeting or any previous meetings that the participants had.

In some aspects, the insight extractor 126 may be configured to extract key points based on everything that has hitherto been discussed or shared during the collaboration meeting. In some aspects, the insight extractor 126 may be configured to extract key points that are specific to a participant based on information that is likely be important to the participant. To do so, the insight extractor 126 may be configured to extract insights based on the engagement and interests of the particular participant. The interests of the participant may be explicitly or implicitly provided by the participant and/or predicted by the insight extractor 126.

The insight extractor 126 may be further configured to determine or extract action items, which include any follow up tasks that may include a responsible participant(s) and/or a due date. It should be appreciated that the insight extractor 126 may be configured to enter these tasks in a project management system to assign them to the responsible participant(s) and/or send reminders to the responsible participant(s).

The insight extractor 126 may be further configured to extract question and answer (QnA) pairs. Questions may include questions that the participants asked and/or questions that the insight extractor 126 deems to be interesting based on the context of the discussion so far. Answers may include answers that one or more participants answered in response to a question, answers that the insight extractor 126 determined based on the meeting contents that have hitherto been discussed or shared, and/or answers that the insight extractor 126 found by searching outside of the meeting contents (e.g., by searching the Internet). It should be appreciated that a question may include several answers from multiple participants and the insight extractor 126.

The insight extractor 126 may be further configured to extract contents from links and documents shared by the participants. For example, whenever a resource (e.g., a link or document) is shared in the collaborative meeting, the insight extractor 126 is configured to access the shared resource and summarizes its contents. The extracted insights may include the resource (e.g., the link or a copy of the document as an attachment) along with a short summary describing what the resource is about.

The insight extractor 126 may be further configured to extract screenshots of presentation materials. For example, the insight extractor 126 may be configured to capture screenshots whenever it determines that something is likely be important. For example, the collaboration interactor 128 may be configured to recognize something as important based on engagement and interests of the participants. To do so, the insight extractor 126 may be configured to listen to voices of the participants for sentiment analysis to determine if the participants have strong reaction (e.g., particularly excited, upset, or emotional) when a particular slide or screen is shared in the collaborative meeting. Additionally, or alternatively, the insight extractor 126 may monitor a density of dialog, a number of participants speaking or texting, a number of hand-raised or emojis in a chat box when a particular slide or screen is shared in the collaborative meeting. Generally, more engagement by the participants means that it is more important or interesting part of the collaborative meeting.

In some aspects, the collaboration interactor 128 may be further configured to extract screenshots that are specific for a participant based on information that is likely be important to the participant. To do so, the collaboration interactor 128 may extract screenshots based on the engagement and interests of the particular participant. The interests of the participant may be explicitly or implicitly provided by the participant and/or predicted by the collaboration interactor 128. The collaboration interactor 128 may be a generative pre-trained machine learning model (or other type of machine learning model) and/or a process or an application leveraging a generative pre-trained machine learning model.

However, it should be appreciated that, in some aspects, the collaboration interactor 128 may capture screenshots every predetermined time period or whenever a new slide or screen is shown. In some aspects, the collaboration interactor 128 may further process the screenshots to extract information of the screenshots. The extracted insights may include an image of the screenshot along with a short summary describing what the screenshot is about. In some aspects, the extracted insights may further include the participants' reactions at the time when the corresponding slide or screen was shared during the collaborative meeting.

During the collaborative meeting, the collaboration interactor 128 is configured to interact or collaborate with one or more participants of the collaborative meeting. To do so, the collaboration interactor 128 further includes a collaborative canvas interactor 130 and a chat box interactor 132.

The collaborative canvas interactor 130 is configured to interact with the participants in the collaborative canvas during the collaborative meeting. It should be appreciated that the collaborative canvas is accessible and editable by the participants and includes a structured summary log that captures important meeting contents that have hitherto been discussed or shared during the collaborative meeting. Further, content generated by a generative model may be included in the collaborative canvas (e.g., summary information, answers, etc.). The content generated by the generative machine learning model may be edited by the participants. Edited content may be provided to the generative machine learning model and used by the generative machine learning model when making future determinations or when generating future content. In further examples, the collaborative canvas interactor 130 is configured to respond (e.g., edit, correct, or add information) to changes made in the collaborative canvas by the participants. The collaborative canvas interactor 130 is further configured to determine whether a response is needed to correct the inputs or provide more information in the collaborative canvas based on the inputs. Such corrections and additional information may be based on the meeting contents that have hitherto been discussed or shared during the collaborative meeting and web-based search results from the Internet.

The chat box interactor 132 is configured to interact with the participants in a group chat box and a private chat box during the collaborative meeting. It should be appreciated that the group chat box associated with the collaborative meeting is accessible by all participants and includes text transcript of speech of all participants and any text chat messages received from the participants during the collaborative meeting in near real-time. For example, the chat box interactor 132 may be configured to respond (e.g., edit, correct, or add information) to questions that the participants asked in the group chat box. To do so, the collaboration assistant 120 is configured to determine whether a question was raised, presented, or otherwise implied in the group chat box. In some aspects, the chat box interactor 132 is configured to receive questions addressed directly to the chat box interactor 132 for answers.

Subsequently, the chat box interactor 132 is further configured to analyze participants' responses in the group chat box. The chat box interactor 132 is configured to provide a correct answer if the participants' responses are not correct or to provide additional information based on the meeting contents that have hitherto been discussed or shared during the collaborative meeting. The chat box interactor 132 is further configured to conduct independent searches on the Internet to obtain answers or additional information. Additionally, the chat box interactor 132 is configured to generate answers on its own using a generative machine learning model in the case when there are no answers provided by other participants (e.g., no response, acknowledgement of no answer) or in instances where the answer can be determined by the generative machine learning model, in the group chat box.

Additionally, the chat box interactor 132 is configured to interact with an individual participant in the private chat box associated with the collaborative meeting. For example, the chat box interactor 132 is configured to receive a question or query from an individual participant related to the collaboration meeting or any general questions that the individual participant does not want to ask or share in the group chat box. The chat box interactor 132 is configured to generate one or more answers or responses based on the meeting contents that have hitherto been discussed or shared during the collaborative meeting. Additionally, the chat box interactor 132 is further configured to conduct independent searches on the Internet to obtain answers or additional information to respond to the individual participant.

The structured summary log generator 134 is configured to generate a structured summary log based on the insights that have hitherto been extracted during the collaborative meeting. The structured summary log generator 134 may be a generative pre-trained machine learning model (or other type of machine learning model) and/or a process or an application leveraging a generative pre-trained machine learning model. The structured summary log captures the insights that represent the meeting contents that are deemed important to the participants based on, for example, measurement of engagement and interests of participants. If the structured summary log associated with the collaborative meeting already exists, the structured summary log generator 134 is configured to update the structured summary log based on the insights of the collaborative meeting so far. The structured summary log may be updated every predetermined time period or every predetermined number of shared meeting contents. The structured summary log generator 134 is further configured to present the structured summary log in the collaborative canvas accessible by the participants during the collaborative meeting. The participants may edit, correct, and add contents in the collaborative canvas during the collaborative meeting. The collaborative canvas is updated in near real-time whenever the participants make changes to the contents in the collaborative canvas. In the illustrative aspect, the collaborative canvas is presented on a user interface 144. For example, the collaborative canvas may be pinned to a chat box associated with the collaborative meeting.

The meeting summary generator 136 is configured to generate a customized meeting summary for each participant of the collaborative meeting, including the attending participants and the non-attending participants. The customized meeting summary is individually tailored to an individual participant of the collaborative meeting. The customized meeting summary may be generated based on the insights from the collaborative meeting and information that is deemed important and interesting to the individual participant (e.g., based on engagement of the individual participant during the collaboration meeting and interests of the individual participant of the individual participant obtained prior, during, or after the collaboration meeting). Additionally, the customized meeting summary also includes any actions items that are specific to the individual participant.

Figure 2A:
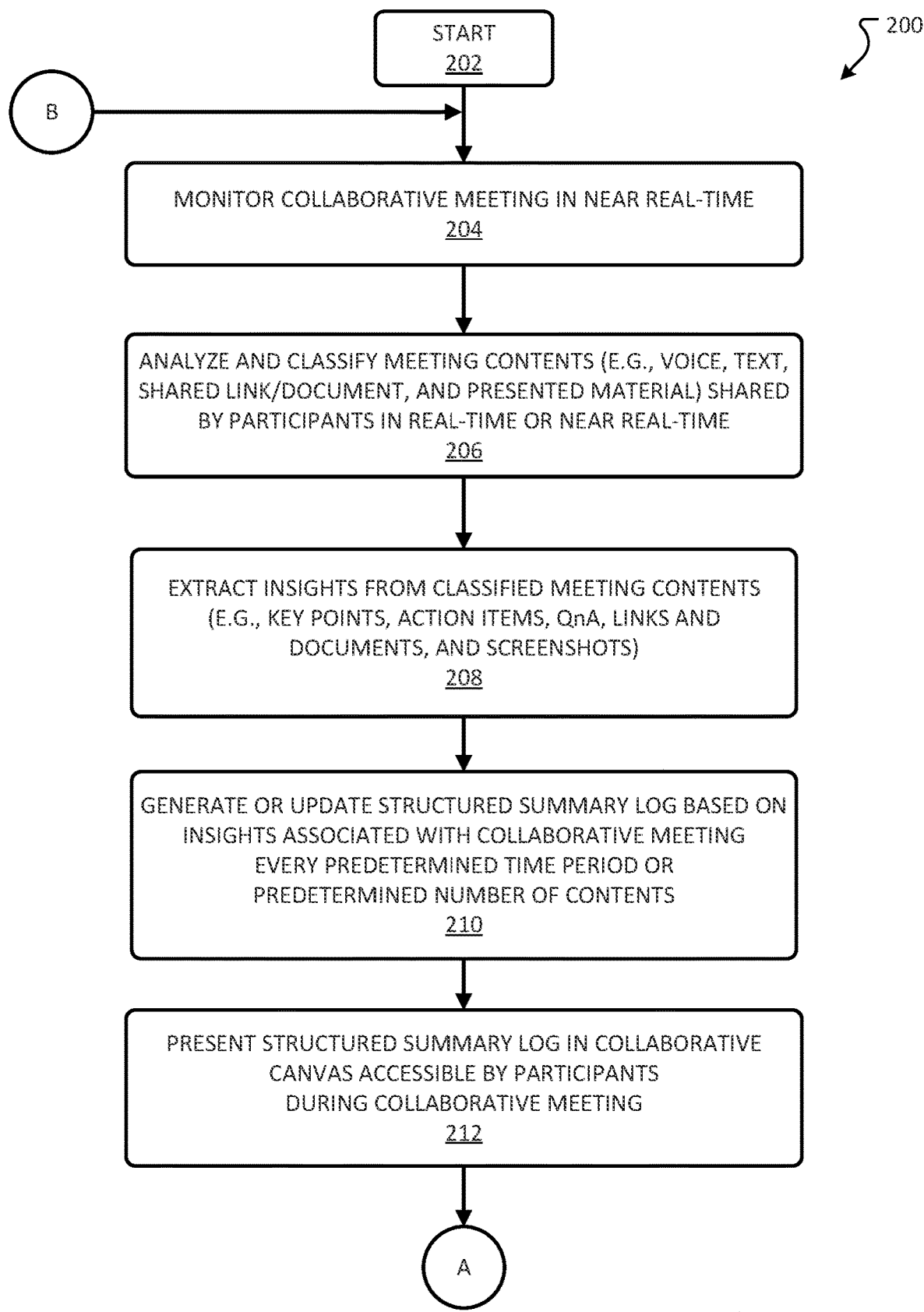
FIGS. 2A and 2B are a flowchart of an example method of assisting participants during a collaborative meeting in near real-time in accordance with examples of the present disclosure.
Figure 2B:
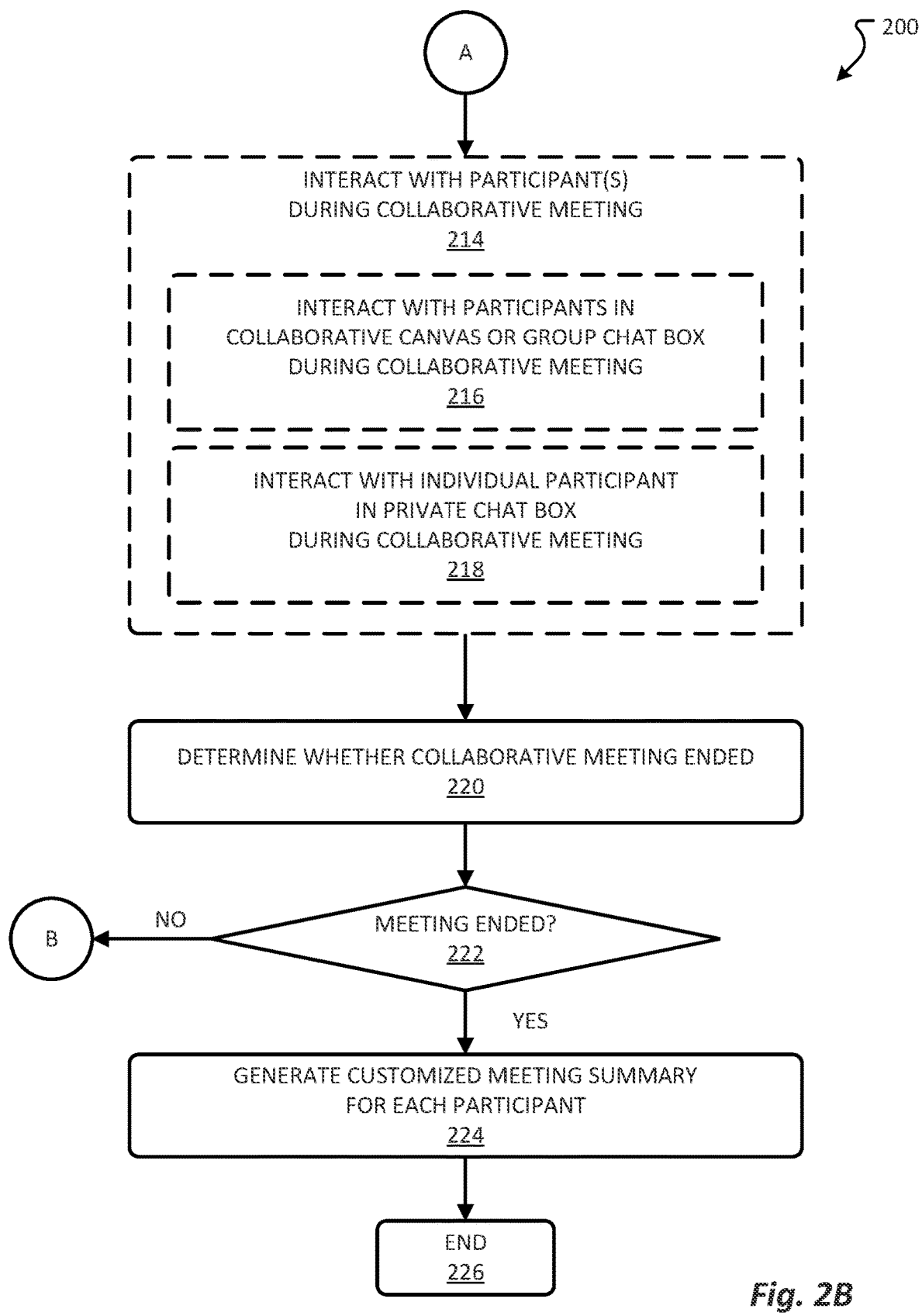

Referring now to FIGS. 2A and 2B, a method 200 for assisting participants during a collaborative meeting in near real-time in accordance with examples of the present disclosure is provided. A general order for the operations of the method 200 is shown in FIGS. 2A and 2B. Generally, the method 200 starts at 202 and ends at 226. The method 200 may include more or fewer operations or may arrange the order of the operations differently than those shown in FIGS. 2A and 2B. In the illustrative aspect, the method 200 is performed by a collaboration assistant (e.g., a collaboration assistant 120) of a server (e.g., a collaborative platform server 110). For example, the collaborative platform server may be, but is not limited to, a web-server, a server instance on a cloud platform, a cloud-enabled operating system, or any other suitable computing device that is capable of communicating with one or more computing devices (e.g., a computing device 140) associated with one or more participants (e.g., 150). The method 200 can be executed as a set of computer-executable instructions executed by a computer system and encoded or stored on a computer readable medium. The method 200 may be performed using a generative pre-trained transformer machine learning model, or other machine learning model. That is, one of more of the operations described as part of the method 200 may be performed by a machine learning model. Further, the method 200 can be performed by gates or circuits associated with a processor, Application Specific Integrated Circuit (ASIC), a field programmable gate array (FPGA), a system on chip (SOC), or other hardware device. Hereinafter, the method 200 shall be explained with reference to the systems, components, modules, software, data structures, user interfaces, etc. described in conjunction with FIG. 1.

The method 200 starts at 202, where flow may proceed to 204. At 204, the collaboration assistant 120 monitors a collaborative meeting in near real-time. For example, the collaboration assistant 120 monitors activities of the attending participants. The attending participants may share contents during the collaborative meeting. The meeting contents include the voices of participants, text transcript of speech of participants, text chat messages, shared links and documents, presentation materials, and the like. Additionally, the collaboration assistant 120 may further monitor activities of the non-attending participants. For example, a non-attending participant may request the collaboration assistant 120 to send a periodic update throughout the collaborative meeting and/or a notification when the non-attending participant is mentioned during the collaborative meeting in near real-time.

At 206, the collaboration assistant 120 analyzes and classifies the meeting contents that are shared by the participants in real-time or near real-time during the collaborative meeting. The classification of the meeting contents is based on a type of the meeting contents. For example, as described above, the types of the meeting contents include voices of participants, text transcript of speech of participants, text chat messages, shared links and documents, and presentation materials (e.g., materials presented to the participants during the collaborative meeting).

At 208, the collaboration assistant 120 extracts insights from the classified meeting contents using one or more semantic models. Specifically, the insights are extracted and updated during predetermined time period based on the classified meeting contents that have hitherto been discussed or shared during the collaborative meeting. It should be appreciated that the insights are stored in an insight database (e.g., 138). For example, the insights include key points, action items, question and answer (QnA) pairs, contents from links and documents, and screenshots of presentation materials.

More specifically, the collaboration assistant 120 may extract key points of what was discussed so far. The key points may further include an identity of one or more participants who were discussing and whether any conclusions, decisions, or suggestions were made. It should be appreciated that the key points may be extracted based on the meeting contents that are likely be important to the participants. To do so, the collaboration assistant 120 may extract insights based on the engagement and interest of the participants. For example, the collaboration assistant 120 may recognize something as important based on engagement and interests of the participants. In some aspects, the collaboration assistant 120 may learn and predict the interests of the participants based on contents shared during the collaborative meeting or any previous meetings that the participants had. However, it should be appreciated that, in some aspects, the collaboration assistant 120 may extract key points based on everything that was discussed so far.

In some aspects, the collaboration assistant 120 may extract key points that are specific to a participant based on information that is deemed important to the participant. To do so, the collaboration assistant 120 may extract insights based on the engagement and interests of the particular participant. The interests of the participant may be explicitly or implicitly provided by the participant and/or predicted by the collaboration assistant 120.

Additionally, the collaboration assistant 120 may extract action items, which include any follow up tasks that may include a responsible participant(s) and/or a due date. It should be appreciated that the collaboration assistant 120 may enter these tasks in a project management system to assign them to the responsible participant(s) and/or send reminders to the responsible participant(s).

The collaboration assistant 120 may further extract question and answer (QnA) pairs. Questions may include questions that the participants asked and/or questions that the collaboration assistant 120 deems to be interesting based on the context of the discussion so far. Answers may include answers that one or more participants answered in response to a question, answers that the collaboration assistant 120 determined based on the meeting contents that have hitherto been discussed or shared during the collaborative meeting, and/or answers that the collaboration assistant 120 found by searching outside of the meeting contents (e.g., by searching the Internet). It should be appreciated that a question may include several answers from multiple participants and the collaboration assistant 120.

Furthermore, the collaboration assistant 120 may extract contents from links and documents shared by the participants. For example, whenever a resource (e.g., a link or document) is shared in the collaborative meeting, the collaboration assistant 120 accesses the shared resource and summarizes its contents. The extracted insights may include the resource (e.g., the link or a copy of the document as an attachment) along with a short summary describing what the resource is about.

Lastly, the collaboration assistant 120 may extract screenshots of presentation materials. For example, the collaboration assistant 120 may capture screenshots whenever it determines that something is likely be important. For example, the collaboration assistant 120 may recognize something as important based on engagement and interests of the participants. To do so, the collaboration assistant 120 may listen to voices of the participants for sentiment analysis to determine if the participants have strong reaction (e.g., particularly excited, upset, or emotional). Additionally, or alternatively, the collaboration assistant 120 may monitor a density of dialog, a number of participants speaking or texting, a number of hand-raised or emojis in a chat box when a particular slide or screen is shared during the collaborative meeting. Generally, more engagement by the participants means that it is more important or interesting part of the collaborative meeting. However, it should be appreciated that, in some aspects, the collaboration assistant 120 may capture screenshots every predetermined time period or whenever a new slide or screen is shown. In some aspects, the collaboration assistant 120 may further process the screenshots to extract information of the screenshots. The extracted insights may include an image of the screenshot along with a short summary describing what the screenshot is about. In some aspects, the extracted insights may further include the participants' reactions at the time when the corresponding slide or screen was shared during the collaborative meeting.

In some aspects, the collaboration assistant 120 may extract screenshots that are specific to a participant based on information that is deemed important to the participant. To do so, the collaboration assistant 120 may extract screenshots based on the engagement and interests of the particular participant. The interests of the participant may be explicitly or implicitly provided by the participant and/or predicted by the collaboration assistant 120.

At 210, the collaboration assistant 120 generates a structured summary log based on the insights that have hitherto been extracted during the collaborative meeting. If the structured summary log associated with the collaborative meeting already exists, the collaboration assistant 120 updates the structured summary log based on the insights of the collaborative meeting so far. The structured summary log may be updated every predetermined time period or every predetermined number of shared contents. The structured summary log captures the insights that represent the meeting contents that are deemed important to the participants based on, for example, measurement of engagement and interests of participants.

Subsequently, at 212, the collaboration assistant 120 presents the structured summary log in a collaborative canvas accessible by the participants during the collaborative meeting. The participants may edit, correct, and add contents in the collaborative canvas during the collaborative meeting. The collaborative canvas is updated in near real-time whenever the participants make changes to the contents in the collaborative canvas. In the illustrative aspect, the collaborative canvas is presented on a user interface (e.g., 144). For example, the structured summary log may be pinned to a chat box associated with the collaborative meeting.

Figure 3:
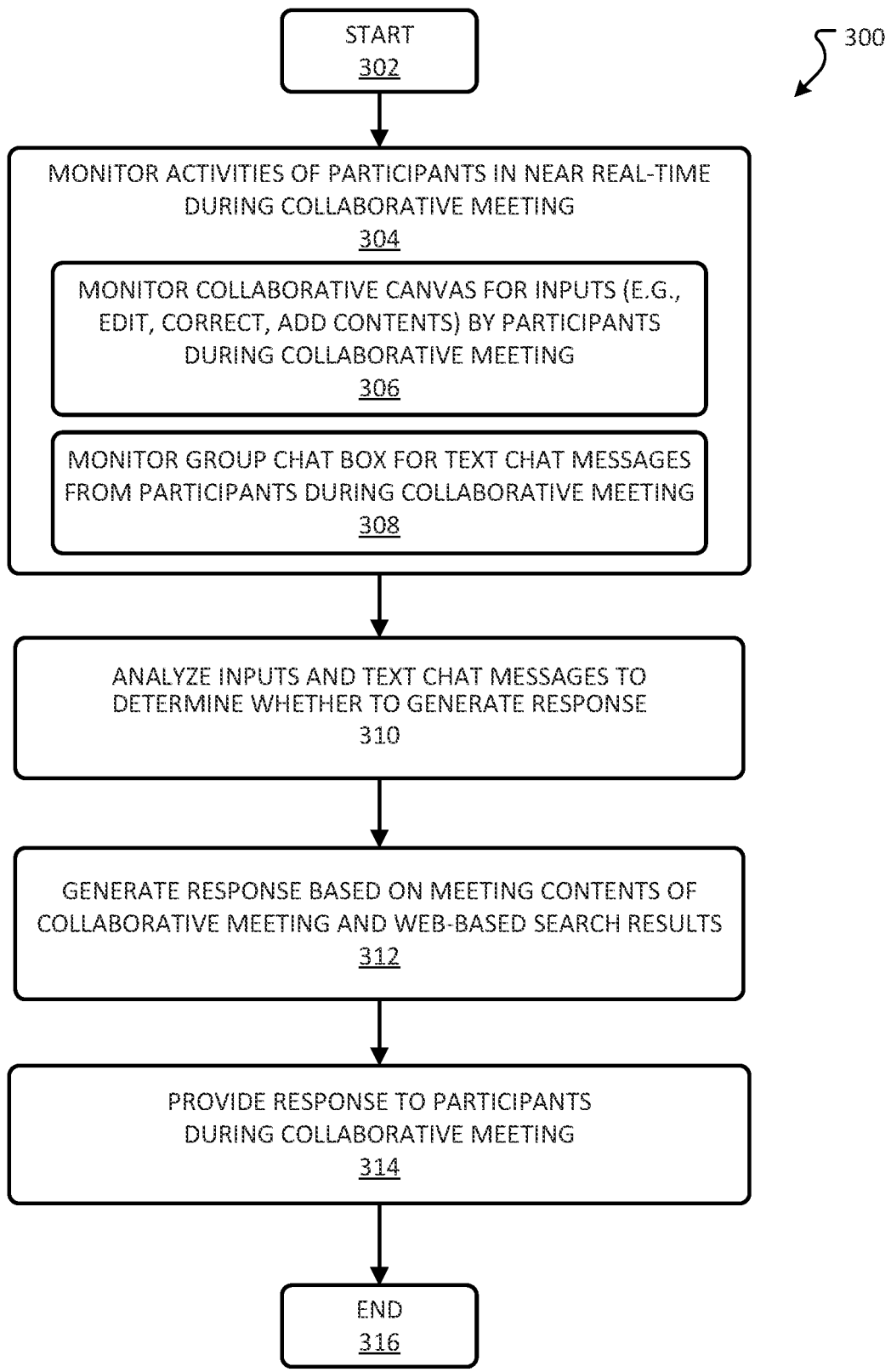
FIG. 3 depicts a flowchart of an example method of interacting with participants during a collaborative meeting in near real-time in accordance with examples of the present disclosure.
Figure 4:
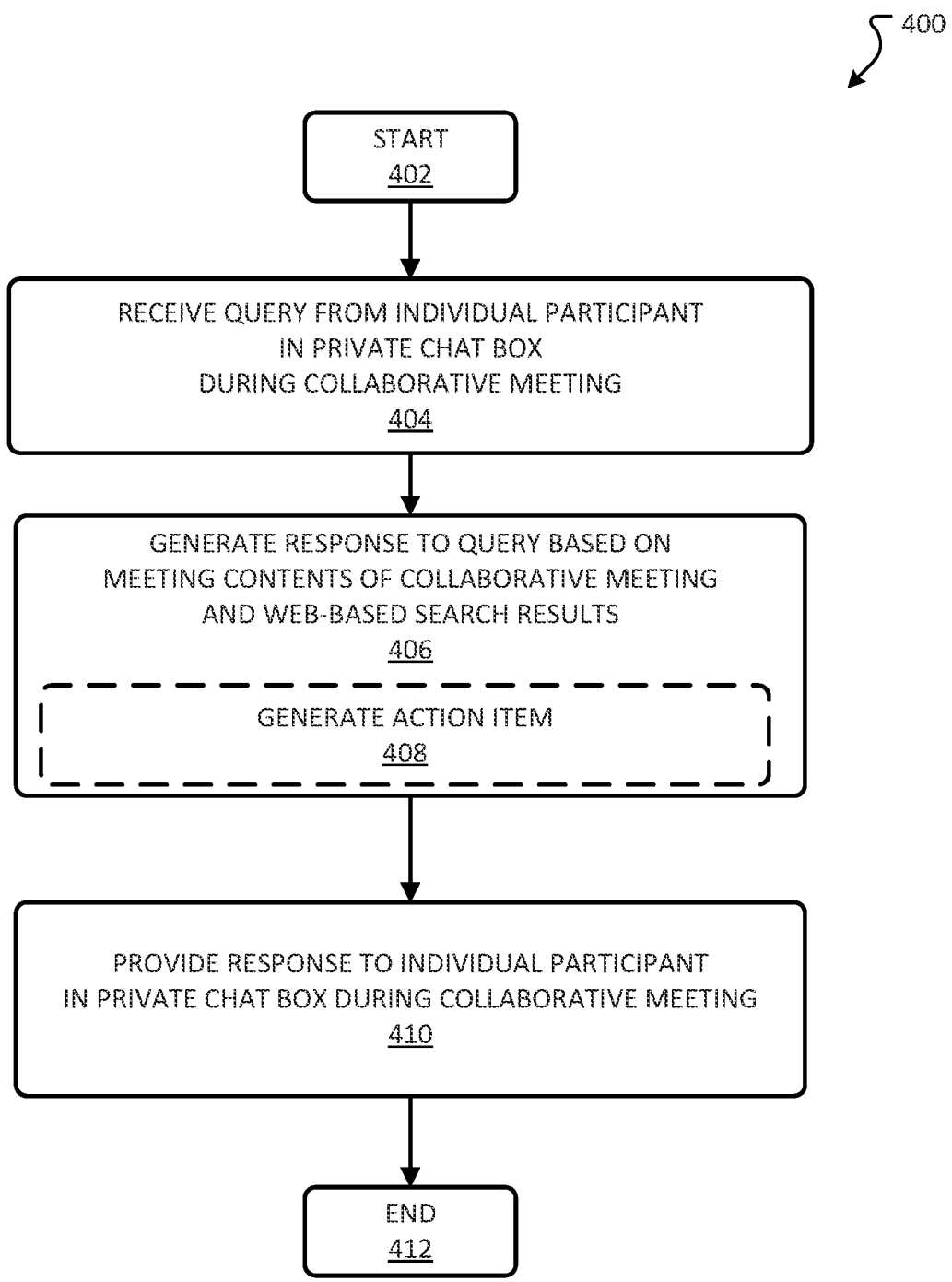
FIG. 4 depicts a flowchart of an example method of interacting with an individual participant during a collaborative meeting in near real-time in accordance with examples of the present disclosure.

At 214 in FIG. 2B, in some aspects, the collaboration assistant 120 may interact with one or more participants of the collaborative meeting, which is further described in more detail in FIGS. 3 and 4. It should be appreciated that operations 214-218 may be performed simultaneously with operations 204-212.

To do so, at 216, the collaboration assistant 120 may interact with the participants in the collaborative canvas during the collaborative meeting. For example, the collaboration assistant 120 may respond (e.g., edit, correct, or add information) to changes made in the collaborative canvas by the participants.

Additionally, during the collaborative meeting, the collaboration assistant 120 may interact with the participants in a group chat box associated with the collaborative meeting. It should be appreciated that the group chat box is accessible by the participants and includes text transcript of speech of participants during the collaborative meeting in near real-time and any text chat messages received from the participants. For example, the collaboration assistant 120 may respond (e.g., edit, correct, or add information) to questions that the participants asked in the group chat box. To do so, the collaboration assistant 120 monitors the group chat box and determines whether a question was raised, presented, or otherwise implied in the group chat box. Subsequently, the collaboration assistant 120 may further monitor the group chat box for participants' responses. The collaboration assistant 120 may provide a correct answer if the participants' responses are not correct or provide additional information based on the meeting contents that have hitherto been discussed or shared during the collaborative meeting. The collaboration assistant 120 may also conduct independent searches on the Internet to obtain answers or additional information. Additionally, the collaboration assistant 120 may provide answers if the collaboration assistant 120 determines that no answers were attempted by the participants (e.g., no response, acknowledgement of no answer). In some aspects, the participants may ask the questions directly to the collaboration assistant 120 for answers.

Simultaneously, at 218, during the collaborative meeting, the collaboration assistant 120 may interact with an individual participant in a private chat box associated with the collaborative meeting. For example, the individual participant may ask questions to the collaboration assistant 120 related to the collaboration meeting or any general questions that the individual participant does not want to ask in the group chat box. The collaboration assistant 120 may generate answers based on the meeting contents that have hitherto been discussed or shared during the collaborative meeting. Additionally, the collaboration assistant 120 may also conduct independent searches on the Internet to obtain answers or additional information to respond to the individual participant.

At 220, the collaboration assistant 120 continually or periodically determines whether the collaborative meeting has ended. If the collaboration assistant 120 determines that the collaborative meeting has not yet ended, the method 200 loops back to operation 204 to continue to monitor activities in the collaborative meeting in near real-time.

If, however, the collaboration assistant 120 determines that the collaborative meeting has ended, the method 200 advances to operation 224. At 224, the collaboration assistant 120 generates a customized meeting summary for each participant of the collaborative meeting, including the attending participants and the non-attending participants. The customized meeting summary is individually tailored to an individual participant of the collaborative meeting. The customized meeting summary may be generated based on the insights from the collaborative meeting and information that is deemed important and interesting to the individual participant (e.g., based on engagement of the individual participant during the collaboration meeting and interests of the individual participant of the individual participant obtained prior, during, or after the collaboration meeting). Additionally, the customized meeting summary also includes any actions items that are specific to the individual participant. The method 200 may end at 226.

Referring now to FIG. 3, a method 300 for interacting with participants during a collaborative meeting in near real-time in accordance with examples of the present disclosure is provided. Generally, the method 300 illustrates a sequence of operations for interacting with the participants 216 of FIG. 2B. A general order for the operations of the method 300 is shown in FIG. 3. Generally, the method 300 starts at 302 and ends at 316. The method 300 may include more or fewer operations or may arrange the order of the operations differently than those shown in FIG. 3. In the illustrative aspect, the method 300 is performed by a collaboration assistant (e.g., a collaboration assistant 120) of a server (e.g., a collaborative platform server 110). For example, the collaborative platform server may be, but is not limited to, a web-server, a server instance on a cloud platform, a cloud-enabled operating system, or any other suitable computing device that is capable of communicating with one or more computing devices (e.g., a computing device 140) associated with one or more participants (e.g., 150). The method 300 can be executed as a set of computer-executable instructions executed by a computer system and encoded or stored on a computer readable medium. The method 300 may be performed using a generative pre-trained transformer machine learning model, or other machine learning model. That is, one of more of the operations described as part of the method 300 may be performed by a machine learning model. Further, the method 300 can be performed by gates or circuits associated with a processor, Application Specific Integrated Circuit (ASIC), a field programmable gate array (FPGA), a system on chip (SOC), or other hardware device. Hereinafter, the method 300 shall be explained with reference to the systems, components, modules, software, data structures, user interfaces, etc. described in conjunction with FIG. 1.

The method 300 starts at 302, where flow may proceed to 304. At 304, the collaboration assistant 120 monitors activities of participants in near real-time during a collaborative meeting. To do so, at 306, the collaboration assistant 120 monitors a collaborative canvas associated with the collaborative meeting to determine if any inputs have been received from the participants during the collaborative meeting. As described above, the collaborative canvas is accessible and editable by the participants and includes a structured summary log that captures important meeting contents that have hitherto been discussed or shared during the collaborative meeting.

Simultaneously, at 308, the collaboration assistant 120 further monitors a group chat box associated with the collaborative meeting. The group chat box is accessible by all the participants and includes text transcript of speech of all participants and any text chat messages received from the participants during the collaborative meeting in near real-time. In other words, the collaboration assistant 120 monitors the hitherto discussion among the participants both in speech and text forms generated or received in the group chat box in near real-time.

Subsequently, at 310, the collaboration assistant 120 analyzes the inputs, text transcript, and the text chat messages to determine whether to respond (e.g., edit, correct, or add information). For example, the collaboration assistant 120 analyzes the inputs (e.g., edits, corrections, or addition of contents) in the collaborative canvas by the participants. In response, the collaboration assistant 120 determines whether a response is needed to correct the inputs or provide more information in the collaborative canvas based on the inputs. Such corrections and additional information may be based on the meeting contents that have hitherto been discussed or shared during the collaborative meeting and web-based search results from the Internet.

Additionally, the collaboration assistant 120 analyzes the text transcript and text chat messages generated or received in the group chat box to determine whether questions were raised, presented, or otherwise implied. In some aspects, the participants may ask the questions directly to the collaboration assistant 120 for answers. The collaboration assistant 120 further analyzes the group chat box for participants' responses to the questions. The collaboration assistant 120 may determine to provide a correct answer if the participants' responses are not correct or to provide additional information based on the meeting contents that have hitherto been discussed or shared during the collaborative meeting. The collaboration assistant 120 may also conduct independent searches on the Internet to obtain answers or additional information. Additionally, the collaboration assistant 120 may determine to provide answers if the collaboration assistant 120 determines that no answers were attempted by the participants (e.g., no response, acknowledgement of no answer).

At 312, in response to determining to provide one or more responses, the collaboration assistant 120 generates one or more responses based on the meeting contents that have hitherto been discussed or shared during the collaborative meeting and the web-based search results.

Subsequently, at 314, the collaboration assistant 120 provides the one or more responses to the participants in the respective forum during the collaborative meeting. Specifically, if the one or more responses are generated in response to the input received in the collaborative canvas, the one or more responses are presented in the collaborative canvas during the collaborative meeting. Additionally, or alternatively, if the one or more responses are generated in response to the text transcript or the text chat messages in the group chat box, the one or more responses are presented in the group chat box during the collaborative meeting. The method 300 may end at 316.

Referring now to FIG. 4, a method 400 for interacting with an individual participant during a collaborative meeting in near real-time in accordance with examples of the present disclosure is provided. Generally, the method 400 illustrates a sequence of operations for interacting with the participants 218 of FIG. 2B. A general order for the operations of the method 400 is shown in FIG. 4. Generally, the method 400 starts at 402 and ends at 412. The method 400 may include more or fewer operations or may arrange the order of the operations differently than those shown in FIG. 4. In the illustrative aspect, the method 400 is performed by a collaboration assistant (e.g., a collaboration assistant 120) of a server (e.g., a collaborative platform server 110). For example, the collaborative platform server may be, but is not limited to, a web-server, a server instance on a cloud platform, a cloud-enabled operating system, or any other suitable computing device that is capable of communicating with one or more computing devices (e.g., a computing device 140) associated with one or more participants (e.g., 150). The method 400 can be executed as a set of computer-executable instructions executed by a computer system and encoded or stored on a computer readable medium. The method 400 may be performed using a generative pre-trained transformer machine learning model, or other machine learning model. That is, one of more of the operations described as part of the method 400 may be performed by a machine learning model. Further, the method 400 can be performed by gates or circuits associated with a processor, Application Specific Integrated Circuit (ASIC), a field programmable gate array (FPGA), a system on chip (SOC), or other hardware device. Hereinafter, the method 400 shall be explained with reference to the systems, components, modules, software, data structures, user interfaces, etc. described in conjunction with FIG. 1.

The method 400 starts at 402, where flow may proceed to 404. At 404, during a collaborative meeting, the collaboration assistant 120 receives a query from an individual participant in a private chat box associated with the collaborative meeting. The query may be a question or a request for an action item. For example, the individual participant may ask questions to the collaboration assistant 120 related to the collaboration meeting or any general questions that the individual participant does not want to ask in the group chat box. Additionally, or alternatively, the individual participant may ask the collaboration assistant 120 to include certain information in a meeting summary that is individually tailored to the individual participant or to send a reminder to the individual participant to perform a certain task (e.g., research about a certain topic related to the collaborative meeting). It should be appreciated that the collaboration assistant 120 may automatically create reminders for tasks based on the contents of the collaborative meeting (e.g., explicit assignment of tasks to certain participants of the collaborative meeting). However, the individual participant may request to create reminders for tasks that may not have been assigned to the individual participant during the collaborative meeting. In other words, the individual participant may request an action item that may not have been otherwise created for the individual participant.

At 406, the collaboration assistant 120 generates answers or responses based on the meeting contents that have hitherto been discussed or shared during the collaborative meeting. To do so, the collaboration assistant 120 may conduct a quick search in a structured summary log of the collaborative meeting stored in an insight database (e.g., 138) for the answer to the query. If the answer cannot be found in the insight database, the collaboration assistant 120 may conduct a further search in the entire contents of the collaborative meeting (e.g., stored in a semantic memory). Additionally, the collaboration assistant 120 may further conduct an independent web-based search on the Internet to obtain answers or additional information to respond to the individual participant.

Subsequently, at 410, the collaboration assistant 120 provides one or more responses to the individual participant in the private chat box during the collaborative meeting. The method 400 may end at 412.

Referring now to FIG. 5, FIG. 5 depicts an exemplary user interface (e.g., 144) illustrating an interaction between a collaboration assistant (e.g., 120) and an individual participant during a collaborative meeting is provided. In the illustrative aspect, the collaboration assistant 120 provides a transcript of the collaborative meeting in near real-time in a transcript section 502 of the user interface 500. The collaboration assistant 120 further provides a structured summary log that captures important meeting contents that have hitherto been discussed or shared during the collaborative meeting in a section 506.

Additionally, in the illustrative aspect, the collaboration assistant 120 provides notes for an individual participant in the notes section 508 during the collaborative meeting. Some notes may be automatically generated by the collaboration assistant 120 or explicitly requested to be added to the note section 508 by the individual participant. Additionally, the collaboration assistant 120 may capture notes from the contents discussed or shared during the collaborative meeting in near real-time based on the individual participant's reaction, engagement, and interest.

The user interface 500 further includes a search box 510, where the individual participant can type a question or query directly to the collaboration assistant 120. For example, when the individual participant types in "How does it work?" after the transcript 514 is generated, the question appears in a private chat box 512. In response, the collaboration assistant 120 provides answers to the question in the private chat box 512 based on the meeting contents (e.g., the text transcript 514) that have hitherto been discussed or shared during the collaborative meeting.

It should be noted that the collaborative meeting in the illustrative example includes only one participant. When there are multiple participants, the transcript section 502 will indicate which participant is speaking.

Figure 6A:
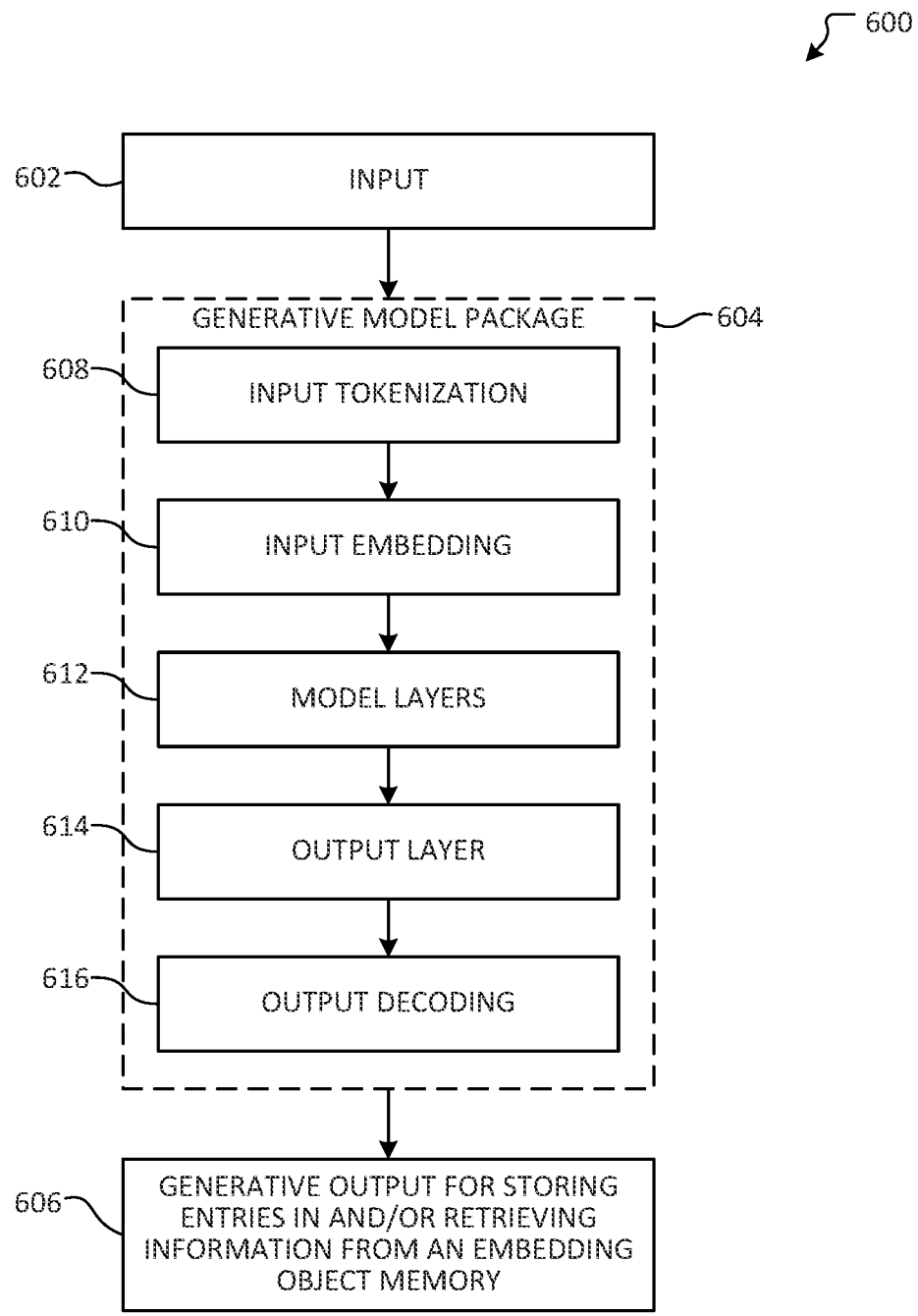
FIGS. 6A and 6B illustrate overviews of an example generative machine learning model that may be used in accordance with examples of the present disclosure.
Figure 6B:
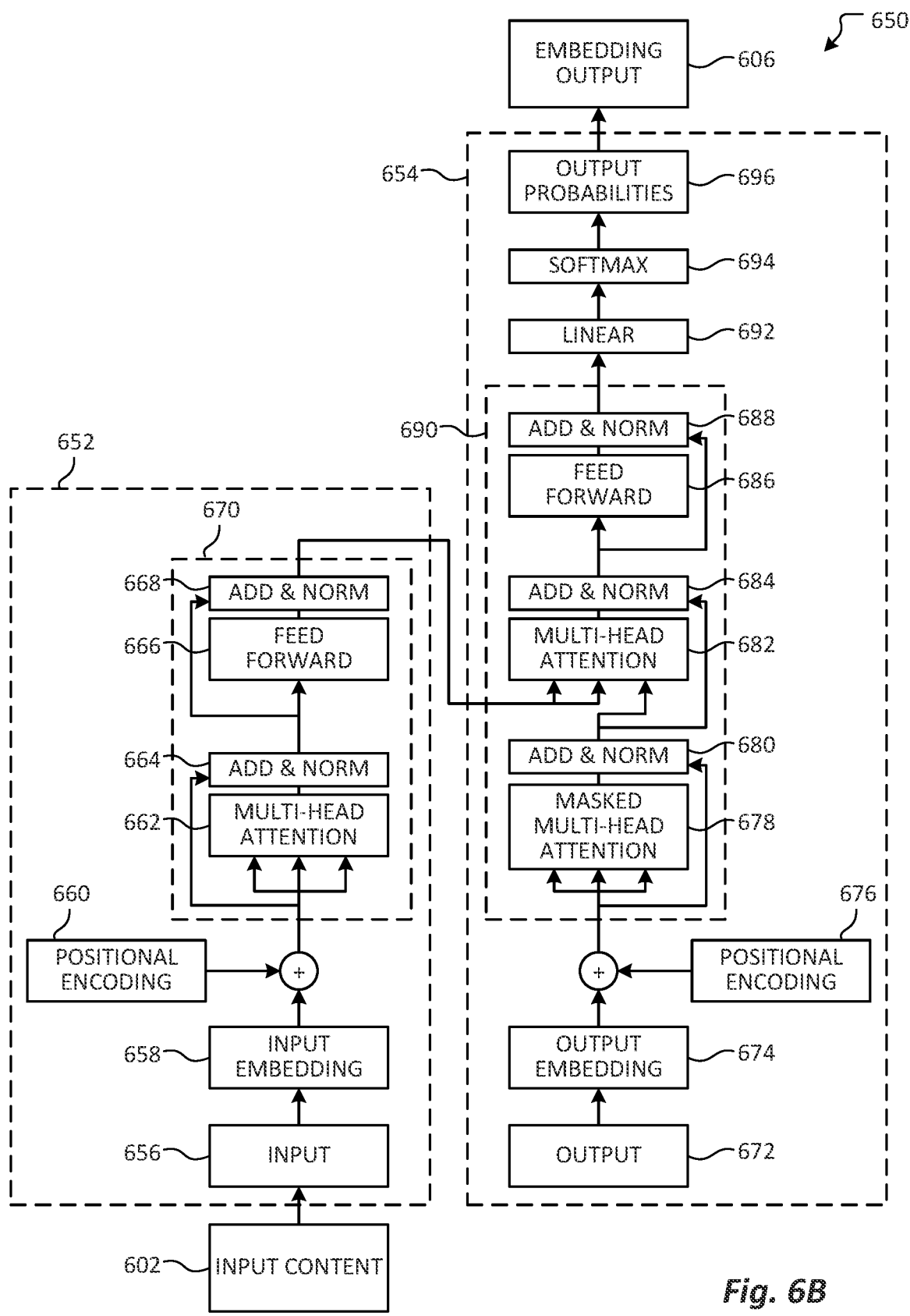

FIGS. 6A and 6B illustrate overviews of an example generative machine learning model that may be used according to aspects described herein. With reference first to FIG. 6A, conceptual diagram 600 depicts an overview of pre-trained generative model package 604 that processes input 602 (e.g., any meeting contents, inputs, questions, or queries discussed or shared by participants during a collaborative meeting) for a skill of a skill chain to generate model output for multi-stage ML model chaining 606 according to aspects described herein. Examples of pre-trained generative model package 604 includes, but is not limited to, Megatron-Turing Natural Language Generation model (MT-NLG), Generative Pre-trained Transformer 3 (GPT-3), Generative Pre-trained Transformer 4 (GPT-4), BigScience BLOOM (Large Openscience Open-access Multilingual Language Model), DALL-E, DALL-E 2, Stable Diffusion, or Jukebox.

In examples, generative model package 604 is pre-trained according to a variety of inputs (e.g., a variety of human languages, a variety of programming languages, and/or a variety of content types) and therefore need not be finetuned or trained for a specific scenario. Rather, generative model package 604 may be more generally pre-trained, such that input 602 includes a prompt that is generated, selected, or otherwise engineered to induce generative model package 604 to produce certain generative model output 606. It will be appreciated that input 602 and generative model output 606 may each include any of a variety of content types, including, but not limited to, text output, image output, audio output, video output, programmatic output, and/or binary output, among other examples. In examples, input 602 and generative model output 606 may have different content types, as may be the case when generative model package 604 includes a generative multimodal machine learning model.

As such, generative model package 604 may be used in any of a variety of scenarios and, further, a different generative model package may be used in place of generative model package 604 without substantially modifying other associated aspects (e.g., similar to those described herein with respect to FIGS. 1-5). Accordingly, generative model package 604 operates as a tool with which machine learning processing is performed, in which certain inputs 602 to generative model package 604 are programmatically generated or otherwise determined, thereby causing generative model package 604 to produce model output 606 that may subsequently be used for further processing.

Generative model package 604 may be provided or otherwise used according to any of a variety of paradigms. For example, generative model package 604 may be used local to a computing device (e.g., computing device 140 in FIG. 1) or may be accessed remotely from a machine learning service (e.g., collaborative platform server 110 in FIG. 1). In other examples, aspects of generative model package 604 are distributed across multiple computing devices. In some instances, generative model package 604 is accessible via an application programming interface (API), as may be provided by an operating system of the computing device and/or by the machine learning service, among other examples.

With reference now to the illustrated aspects of generative model package 604, generative model package 604 includes input tokenization 608, input embedding 610, model layers 612, output layer 614, and output decoding 616. In examples, input tokenization 608 processes input 602 to generate input embedding 610, which includes a sequence of symbol representations that corresponds to input 602. Accordingly, input embedding 610 is processed by model layers 612, output layer 614, and output decoding 616 to produce model output 606. An example architecture corresponding to generative model package 604 is depicted in FIG. 6B, which is discussed below in further detail. Even so, it will be appreciated that the architectures that are illustrated and described herein are not to be taken in a limiting sense and, in other examples, any of a variety of other architectures may be used.

FIG. 6B is a conceptual diagram that depicts an example architecture 650 of a pre-trained generative machine learning model that may be used according to aspects described herein. As noted above, any of a variety of alternative architectures and corresponding ML models may be used in other examples without departing from the aspects described herein.

As illustrated, architecture 650 processes input 602 to produce generative model output 606, aspects of which were discussed above with respect to FIG. 6A. Architecture 650 is depicted as a transformer model that includes encoder 652 and decoder 654. Encoder 652 processes input embedding 658 (aspects of which may be similar to input embedding 610 in FIG. 6A), which includes a sequence of symbol representations that corresponds to input 656. In examples, input 656 includes input and prompt 602 corresponding to a skill of a skill chain, aspects of which may be similar to any meeting contents, inputs, questions, or queries discussed or shared by participants during a collaborative meeting, context from an insights database (e.g., 138), and/or context from a semantic memory, according to aspects described herein.

Further, positional encoding 660 may introduce information about the relative and/or absolute position for tokens of input embedding 658. Similarly, output embedding 674 includes a sequence of symbol representations that correspond to output 672, while positional encoding 676 may similarly introduce information about the relative and/or absolute position for tokens of output embedding 674.

As illustrated, encoder 652 includes example layer 670. It will be appreciated that any number of such layers may be used, and that the depicted architecture is simplified for illustrative purposes. Example layer 670 includes two sub-layers: multi-head attention layer 662 and feed forward layer 666. In examples, a residual connection is included around each layer 662, 666, after which normalization layers 664 and 668, respectively, are included.

Decoder 654 includes example layer 690. Similar to encoder 652, any number of such layers may be used in other examples, and the depicted architecture of decoder 654 is simplified for illustrative purposes. As illustrated, example layer 690 includes three sub-layers: masked multi-head attention layer 678, multi-head attention layer 682, and feed forward layer 686. Aspects of multi-head attention layer 682 and feed forward layer 686 may be similar to those discussed above with respect to multi-head attention layer 662 and feed forward layer 666, respectively. Additionally, masked multi-head attention layer 678 performs multi-head attention over the output of encoder 652 (e.g., output 672). In examples, masked multi-head attention layer 678 prevents positions from attending to subsequent positions. Such masking, combined with offsetting the embeddings (e.g., by one position, as illustrated by multi-head attention layer 682), may ensure that a prediction for a given position depends on known output for one or more positions that are less than the given position. As illustrated, residual connections are also included around layers 678, 682, and 686, after which normalization layers 680, 684, and 688, respectively, are included.

Multi-head attention layers 662, 678, and 682 may each linearly project queries, keys, and values using a set of linear projections to a corresponding dimension. Each linear projection may be processed using an attention function (e.g., dot-product or additive attention), thereby yielding n-dimensional output values for each linear projection. The resulting values may be concatenated and once again projected, such that the values are subsequently processed as illustrated in FIG. 6B (e.g., by a corresponding normalization layer 664, 680, or 684).

Feed forward layers 666 and 686 may each be a fully connected feed-forward network, which applies to each position. In examples, feed forward layers 666 and 686 each include a plurality of linear transformations with a rectified linear unit activation in between. In examples, each linear transformation is the same across different positions, while different parameters may be used as compared to other linear transformations of the feed-forward network.

Additionally, aspects of linear transformation 692 may be similar to the linear transformations discussed above with respect to multi-head attention layers 662, 678, and 682, as well as feed forward layers 666 and 686. Softmax 694 may further convert the output of linear transformation 692 to predicted next-token probabilities, as indicated by output probabilities 696. It will be appreciated that the illustrated architecture is provided in as an example and, in other examples, any of a variety of other model architectures may be used in accordance with the disclosed aspects.

Accordingly, output probabilities 696 may thus form chained ML evaluation output 606 according to aspects described herein, such that the output of the generative ML model (e.g., which may include structured output) is used as input for a subsequent skill of a skill chain according to aspects described herein. In other examples, chained ML evaluation output 606 is provided as generated output after processing a skill chain, which may further be processed according to the disclosed aspects.

Figure 7:
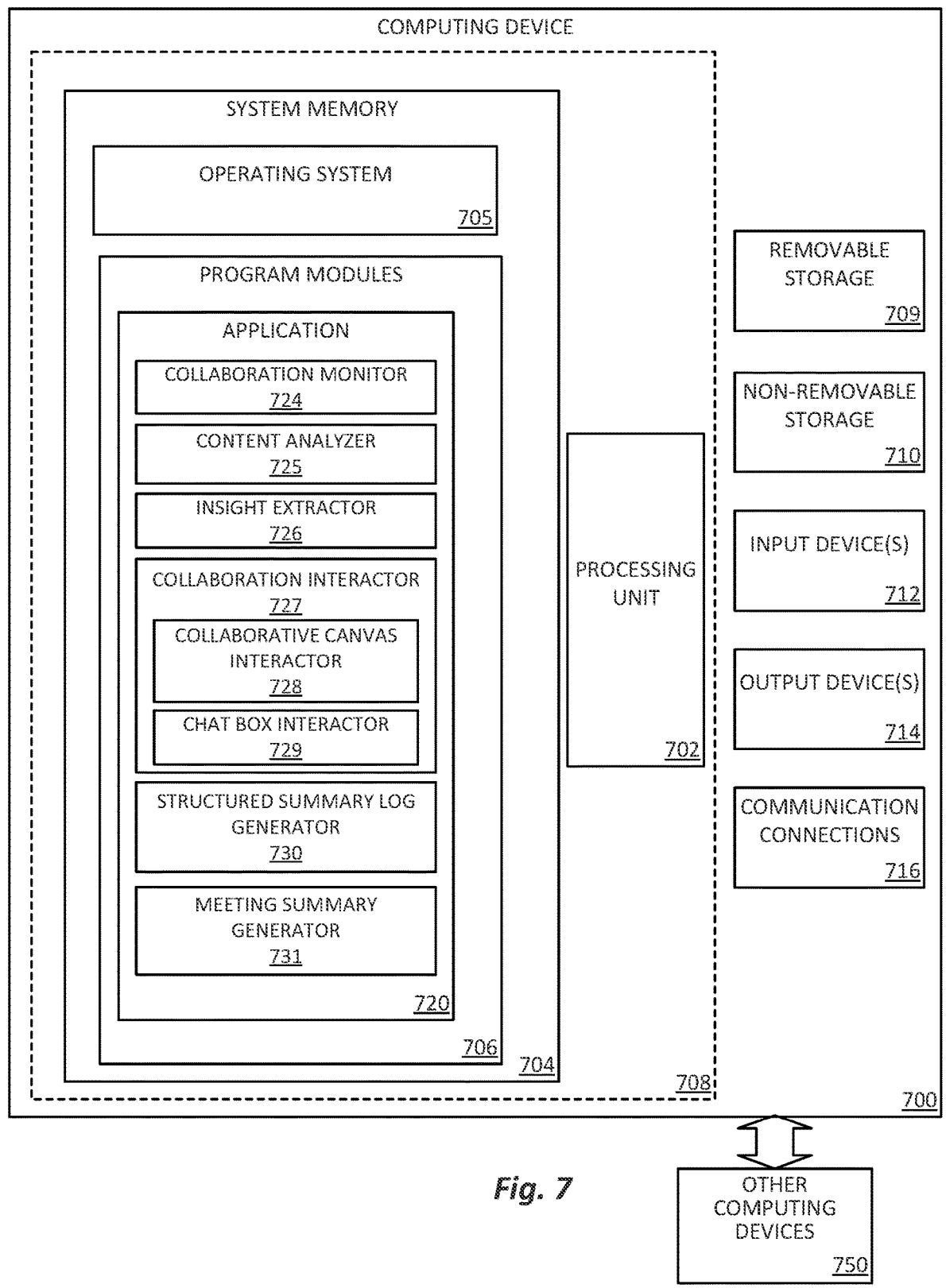
FIG. 7 is a block diagram illustrating example physical components of a computing device with which aspects of the disclosure may be practiced.
Figure 8:
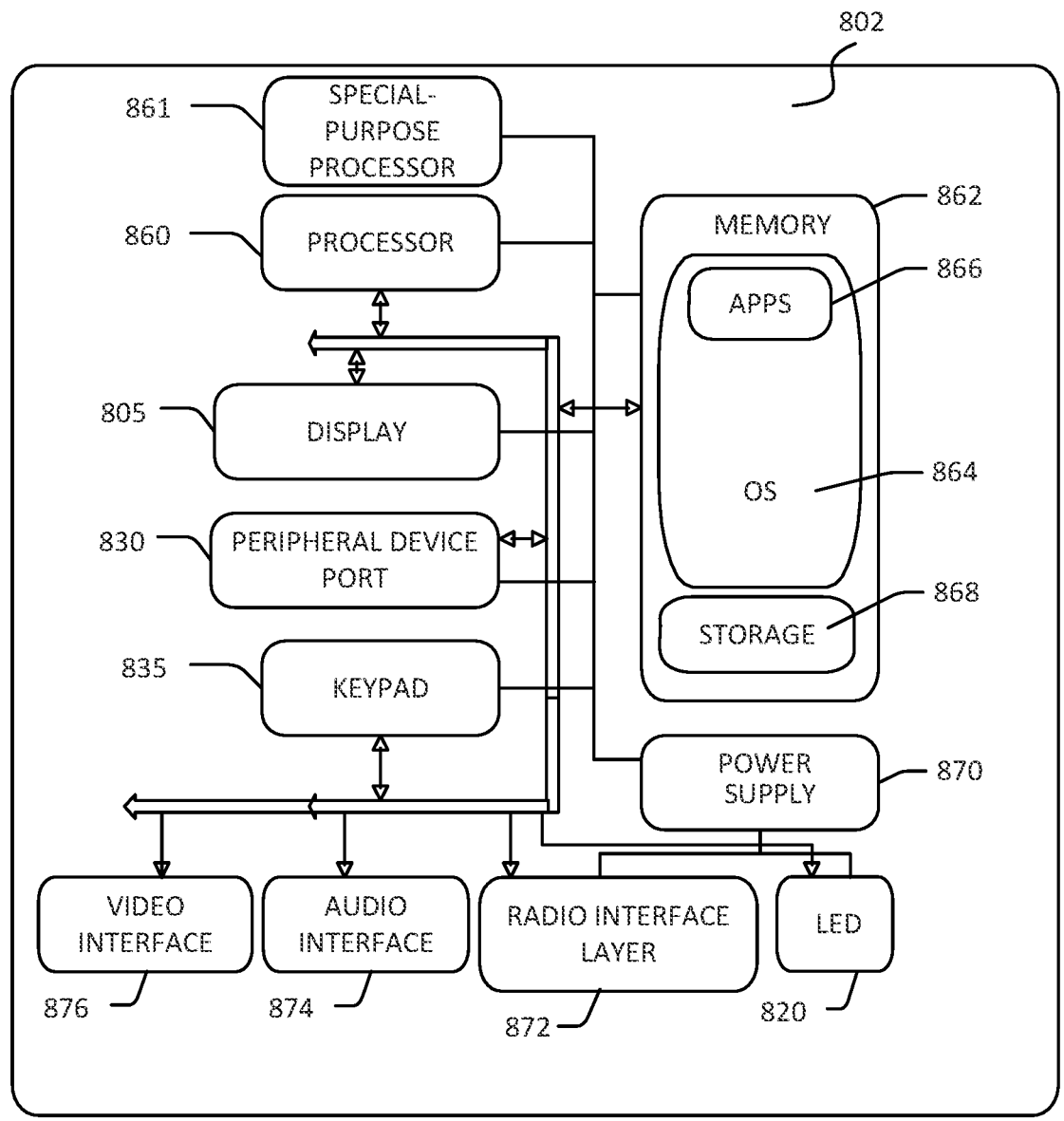
FIG. 8 is a simplified block diagram of a computing device with which aspects of the present disclosure may be practiced.
Figure 9:
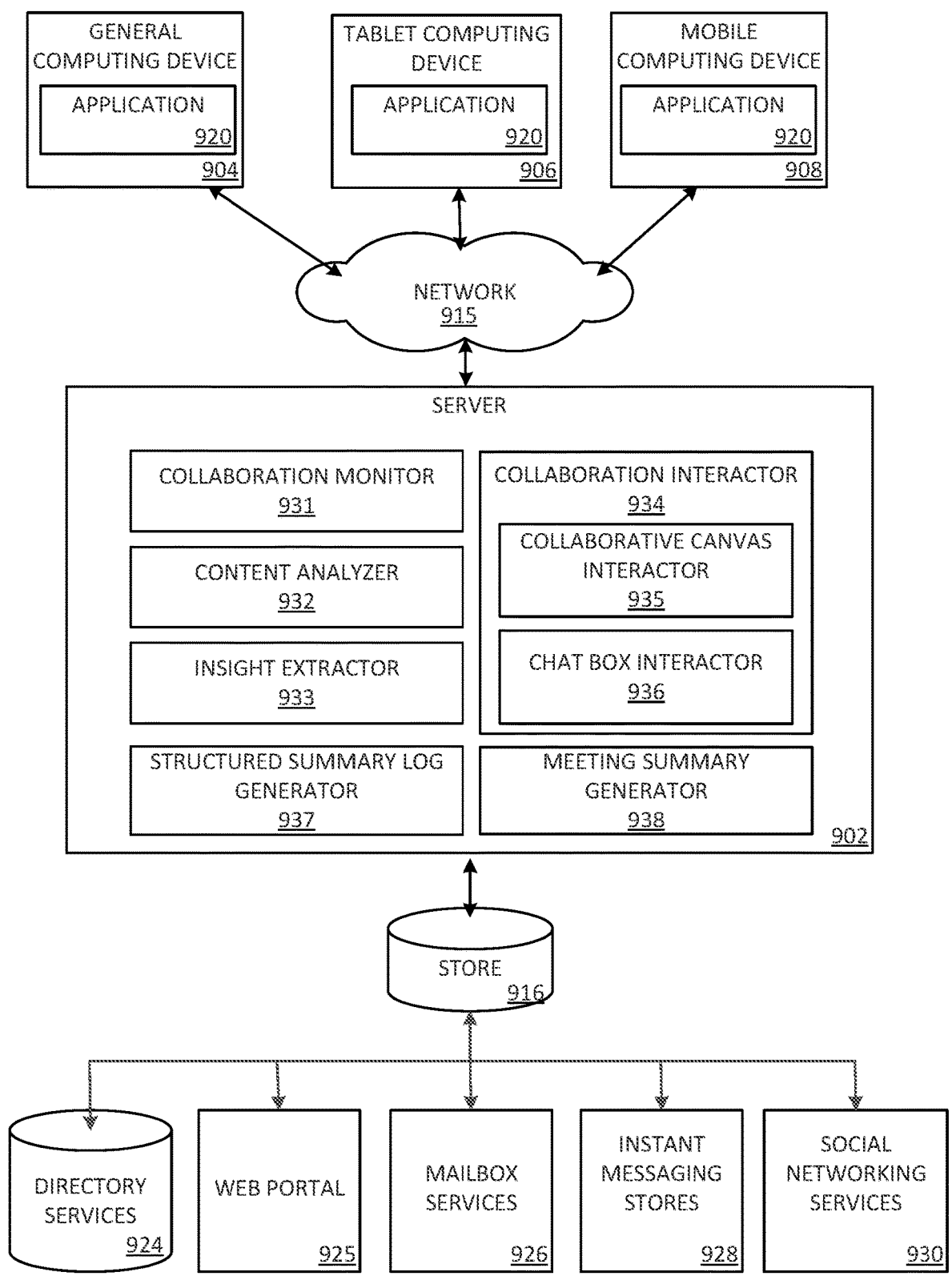
FIG. 9 is a simplified block diagram of a distributed computing system in which aspects of the present disclosure may be practiced.

FIGS. 7-9 and the associated descriptions provide a discussion of a variety of operating environments in which aspects of the disclosure may be practiced. However, the devices and systems illustrated and discussed with respect to FIGS. 7-9 are for purposes of example and illustration and are not limiting of a vast number of computing device configurations that may be utilized for practicing aspects of the disclosure, described herein.

FIG. 7 is a block diagram illustrating physical components (e.g., hardware) of a computing device 700 with which aspects of the disclosure may be practiced. The computing device components described below may be suitable for the computing devices described above, including one or more devices associated with machine learning service (e.g., collaborative platform server 110), as well as computing device 140 discussed above with respect to FIG. 1. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, several program modules and data files may be stored in the system memory 704. While executing on the at least one processing unit 702, the program modules 706 may perform processes including, but not limited to, one or more aspects, as described herein. The application 707 includes a collaboration monitor 724, a content analyzer 725, an insight extractor 726, a collaboration interactor 727, a collaborative canvas interactor 728, a chat box interactor 729, a structured summary log generator 730, and a meeting summary generator 731, as described in more detail with regard to FIG. 1. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 8 illustrates a system 800 that may, for example, be a mobile computing device, such as a mobile telephone, a smart phone, wearable computer (such as a smart watch), a tablet computer, a laptop computer, and the like, with which embodiments of the disclosure may be practiced. In one embodiment, the system 800 is implemented as a "smart phone" capable of running one or more applications (e.g., browser, e-mail, calendaring, contact managers, messaging clients, games, and media clients/players). In some aspects, the system 800 is integrated as a computing device, such as an integrated personal digital assistant (PDA) and wireless phone.

In a basic configuration, such a mobile computing device is a handheld computer having both input elements and output elements. The system 800 typically includes a display 805 and one or more input buttons that allow the user to enter information into the system 800. The display 805 may also function as an input device (e.g., a touch screen display).

If included, an optional side input element allows further user input. For example, the side input element may be a rotary switch, a button, or any other type of manual input element. In alternative aspects, system 800 may incorporate more or less input elements. For example, the display 805 may not be a touch screen in some embodiments. In another example, an optional keypad 835 may also be included, which may be a physical keypad or a "soft" keypad generated on the touch screen display.

In various embodiments, the output elements include the display 805 for showing a graphical user interface (GUI), a visual indicator (e.g., a light emitting diode 820), and/or an audio transducer 825 (e.g., a speaker). In some aspects, a vibration transducer is included for providing the user with tactile feedback. In yet another aspect, input and/or output ports are included, such as an audio input (e.g., a microphone jack), an audio output (e.g., a headphone jack), and a video output (e.g., a HDMI port) for sending signals to or receiving signals from an external device.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 800 also includes a non-volatile storage area 868 within the memory 862. The non-volatile storage area 868 may be used to store persistent information that should not be lost if the system 800 is powered down. The application programs 866 may use and store information in the non-volatile storage area 868, such as e-mail or other messages used by an e-mail application, and the like. A synchronization application (not shown) also resides on the system 800 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the system 800 described herein.

The system 800 has a power supply 870, which may be implemented as one or more batteries. The power supply 870 might further include an external power source, such as an AC adapter or a powered docking cradle that supplements or recharges the batteries.

The system 800 may also include a radio interface layer 872 that performs the function of transmitting and receiving radio frequency communications. The radio interface layer 872 facilitates wireless connectivity between the system 800 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 800 may further include a video interface 876 that enables an operation of an on-board camera 830 to record still images, video stream, and the like.

It will be appreciated that system 800 may have additional features or functionality. For example, system 800 may also include additional data storage devices (removable and/or non-removable) such as, magnetic disks, optical disks, or tape. Such additional storage is illustrated in FIG. 8 by the non-volatile storage area 868.

Data/information generated or captured and stored via the system 800 may be stored locally, as described above, or the data may be stored on any number of storage media that may be accessed by the device via the radio interface layer 872 or via a wired connection between the system 800 and a separate computing device associated with the system 800, for example, a server computer in a distributed computing network, such as the Internet. As should be appreciated, such data/information may be accessed via the radio interface layer 872 or via a distributed computing network. Similarly, such data/information may be readily transferred between computing devices for storage and use according to any of a variety of data/information transfer and storage means, including electronic mail and collaborative data/information sharing systems.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, the computing device 904, 906, 908 may represent the computing device 140 of FIG. 1, and the server device 902 may represent the server 110 of FIG. 1. Additionally, various documents may be stored using a directory service 924, a web portal 925, a mailbox service 926, an instant messaging store 928, or a social networking site 930.

In some aspects, one or more of a collaboration monitor 931, a content analyzer 932, an insight extractor 933, a collaboration interactor 934, a collaborative canvas interactor 935, a chat box interactor 936, a structured summary log generator 937, and a meeting summary generator 938, may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these aspects of the computing devices may obtain content from the store 916, in addition to receiving graphical data useable to be either pre-processed at a graphic-originating system, or post-processed at a receiving computing system. The store may include insight database.

It will be appreciated that the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, operations, functions, and operations discussed herein can be performed continuously and automatically.

The example systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the example aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Example hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

In accordance with examples of the present disclosure, a collaborative platform provides a digital collaboration assistant that continuously monitors and analyzes shared meeting contents (e.g., voice, text chat messages, shared links and documents, presentation materials, and the like) by participants during a collaborative meeting in near real-time, periodically updates a structure summary log of the meeting contents that are deemed important during the collaborative meeting, and interacts with the participants throughout the collaborative meeting in near real-time, for example, to answer questions or provide additional information.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

What is claimed is:

1. A method for facilitating a collaborative meeting, the method comprising:
   monitoring activities of participants of the collaborative meeting;
   extracting insights from meeting contents shared by the participants, wherein the insights are extracted using a generative machine learning model;
   selecting data from the insights that is deemed important based on engagement and interests of the participants;
   generating a structured summary log based on the selected data from the insights associated with the collaborative meeting, wherein the structured summary log is generated using the generative machine learning model;
   presenting the structured summary log in a collaborative canvas accessible by the participants during the collaborative meeting; and
   generating one or more customized meeting summaries for one or more participants after the collaborative meeting, wherein the one or more customized meeting summaries are generated using the generative machine learning model.

2. The method of claim 1, wherein the meeting contents include voice of the participants, text transcript of speech of participants, text chat messages, links and documents, and presentation materials shared by the participants during the collaborative meeting.

3. The method of claim 1, wherein the insights include key points, action items, question-and-answer (QnA) pairs, contents from links and documents, and screenshots of presentation materials.

4. The method of claim 1, wherein generating the structured summary log based on the insights associated with the collaborative meeting comprises generating the structured summary log every determined time period or predetermined number of contents during the collaborative meeting.

5. The method of claim 1, wherein the structured summary log captures the insights that represent the meeting contents that are deemed important to the participants.

6. The method of claim 5, wherein generating the structured summary log includes determining information from the meeting contents as important based on engagement and interests of the participants by listening for sentiment analysis to determine if the participants have a strong reaction.

7. The method of claim 5, wherein generating the structured summary log includes determining information from the meeting contents as important based on engagement and interests of the participants by monitoring a density of dialog, a number of participants speaking or texting, and/or a number of hand-raised or emojis in a chat box when a particular meeting content is shared in the collaborative meeting.

8. The method of claim 1, further comprising receiving, from a participant to the collaborative meeting, a change to content in the collaborative canvas.

9. The method of claim 8, further comprising:
accepting the change to the content in the collaborative canvas; and
resharing the collaborative canvas with the participants.

10. A computing device for facilitating a collaborative meeting, the computing device comprising:
a processor; and
a memory having a plurality of instructions stored thereon that, when executed by the processor, causes the computing device to:
monitor activities of participants of the collaborative meeting;
extract insights from meeting contents shared by the participants, wherein the insights are extracted using a generative machine learning model;
select data from the insights that is deemed important based on engagement and interests of the participants;
generate a structured summary log based on the selected data from the insights associated with the collaborative meeting, wherein the structured summary log is generated using the generative machine learning model;
present the structured summary log in a collaborative canvas accessible by the participants during the collaborative meeting; and
generate one or more customized meeting summaries one or more of the participants after the collaborative meeting, wherein the one or more customized meeting summaries are generated using the generative machine learning model.

11. The computing device of claim 10, wherein the meeting contents include voice of the participants, text transcript of speech of participants, text chat messages, links and documents, and presentation materials shared by the participants during the collaborative meeting, and the insights include key points, action items, question-and-answer (QnA) pairs, contents from links and documents, and screenshots of presentation materials.

12. The computing device of claim 10, further comprising instructions stored thereon that, when executed by the processor, causes the computing device to receive, from a participant to the collaborative meeting, a change to content in the collaborative canvas.

13. The computing device of claim 12, further comprising instructions stored thereon that, when executed by the processor, causes the computing device to:
accept the change to the content in the collaborative canvas; and
reshare the collaborative canvas with the participants.

14. The computing device of claim 10, wherein to interact with the participants during the collaborative meeting includes to interact with an individual participant in a private chat box associated with the collaborative meeting based on the meeting contents that have hitherto been discussed or shared during the collaborative meeting in response to receiving a text message from the individual participant in the private chat box.

15. A non-transitory computer-readable medium storing instructions for facilitating a collaborative meeting, the instructions when executed by one or more processors of a computing device, cause the computing device to perform a method comprising:
monitoring activities of participants of the collaborative meeting;
extracting insights from meeting contents shared by the participants;
selecting data from the insights that is deemed important based on engagement and interests of the participants;
generating a structured summary log based on the selected data from the insights associated with the collaborative meeting;
presenting the structured summary log in a collaborative canvas accessible by the participants during the collaborative meeting;
interacting with participants during the collaborative meeting; and
generating a customized meeting summary for each of the participants after the collaborative meeting.

16. The non-transitory computer-readable medium of claim 15, wherein the meeting contents include voice of the participants, text transcript of speech of participants, text chat messages, links and documents, and presentation materials shared by the participants during the collaborative meeting, and the insights include key points, action items, question-and-answer (QnA) pairs, contents from links and documents, and screenshots of presentation materials.

17. The non-transitory computer-readable medium of claim 15, wherein the structured summary log captures the insights that represent the meeting contents that are deemed important to the participants.

18. The non-transitory computer-readable medium of claim 17, wherein generating the structured summary log includes to determine information from the meeting contents as important based on engagement and interests of the participants by listening for sentiment analysis to determine if the participants have a strong reaction.

19. The non-transitory computer-readable medium of claim 17, wherein to select data from the insights that is deemed important based on engagement and interests of the participants includes to monitor a density of dialog, a number of participants speaking or texting, and/or a number of hand-raised or emojis in a chat box when a particular meeting content is shared in the collaborative meeting.

20. The non-transitory computer-readable medium of claim 15, wherein the method further comprises:
receiving, from a participant to the collaborative meeting, a change to content in the collaborative canvas;
accepting the change to the content in the collaborative canvas; and
resharing the collaborative canvas with the participants.

* * * * *